United States Patent

Lisec

[11] Patent Number: 5,873,922
[45] Date of Patent: Feb. 23, 1999

[54] PROCESS FOR DIVIDING GLASS PANELS INTO BLANKS

[76] Inventor: Peter Lisec, Bahnhofstrasse 34, A-3363 Amstetten-Hausmening, Austria

[21] Appl. No.: 860,590
[22] PCT Filed: Jan. 17, 1996
[86] PCT No.: PCT/AT96/00004
   § 371 Date: Jul. 8, 1997
   § 102(e) Date: Jul. 8, 1997
[87] PCT Pub. No.: WO96/22948
   PCT Pub. Date: Aug. 1, 1996

[30] Foreign Application Priority Data

Jan. 24, 1995 [AT] Austria .................................. A 118/95

[51] Int. Cl.⁶ ........................................................ B26D 3/08
[52] U.S. Cl. ................................ 65/112; 65/105; 65/166; 65/174; 65/176; 83/879; 83/880
[58] Field of Search ............................. 65/105, 112, 166, 65/174, 176; 83/879, 880

[56] References Cited

U.S. PATENT DOCUMENTS

| | | | |
|---|---|---|---|
| 3,740,524 | 6/1973 | Dahlberg et al. | 219/121.69 |
| 3,976,288 | 8/1976 | Cuomo, Jr. | 269/21 |
| 4,871,104 | 10/1989 | Cassese | 225/96.5 |
| 5,040,342 | 8/1991 | McGuire et al. | 451/44 |
| 5,165,585 | 11/1992 | Lisec | 225/2 |
| 5,209,627 | 5/1993 | Lisec | 414/398 |

FOREIGN PATENT DOCUMENTS

| | | |
|---|---|---|
| 0 457 751 | 11/1991 | European Pat. Off. . |
| 0 477 163 | 3/1992 | European Pat. Off. . |
| 0 564 758 | 10/1993 | European Pat. Off. . |
| 0 603 151 | 6/1994 | European Pat. Off. . |
| 2 574 392 | 6/1986 | France . |

Primary Examiner—Peter Chin
Assistant Examiner—Sean Vincent
Attorney, Agent, or Firm—Young & Thompson

[57] ABSTRACT

Lines are scribed on glass panes in accordance with the sections to be produced and the glass panes are then broken into sections susbtantially in a vertical position. A device suitable therefor comprises a station (2) for scribing the glass panes (1) with a substantially vertical supporting surface (25) and a conveyor (13) at its lower edge. Adjoining the station (2) is a first breaking station (3) and second one (4) in which the X-notches are opened and frontal edge sections (XR) are separated. The sections (27) of glass panes (1) thus obtained are turned through 90° about the axis perpendicular to the supporting surface (25) in a turning station (5). The Y notches are broken in another breaking station (8). After any edge strips (XR) and residual pieces (R) have been removed, the sections thus obtained are inserted directly into a device (12) for their intermediate storage or fed to a double-glazing line.

13 Claims, 2 Drawing Sheets

PROCESS FOR DIVIDING GLASS PANELS INTO BLANKS

BACKGROUND OF THE INVENTION

The invention relates to a process for dividing glass panels into blanks, in which the glass panels are notched and then broken according to the blanks to be produced.

The invention further relates to a device for dividing glass panels into blanks with a station for notching glass panels, a station that has an essentially vertically oriented support surface with a conveyor on its lower edge and a cutting head adjustable along the support surface, and with stations for breaking the glass panels along previously produced notched lines (X, Y) into blanks.

DESCRIPTION OF THE RELATED ART

In the known processes for dividing glass panels into blanks, glass cutting tables and breaking tables are used on which the glass panels, lying horizontally, are notched and broken. In this connection, EP-A-457 751 and EP-A-564 758 are pointed out as examples.

A drawback in these known devices for dividing glass panels is not only that they require a lot of space but that the glass panels, which are stored standing essentially vertically in a storage location, must be laid down in a horizontal position and then transported to the glass cutting table. The blanks finally obtained must again be uprighted into a vertical position before they are fed to a further processing or to an intermediate storage location (partitioned vehicle and the like).

Thus the known devices are distinguished by a large space requirement and the known method of working requires the glass panels to be laid down and the blanks obtained to again be uprighted.

It is known from U.S. Pat. No. 4 871 104 to notch and break glass panels while they are oriented standing essentially vertically. For this purpose, the device shown in U.S. Pat. No. 4 871 104 exhibits a support device for the glass panels to be divided, a cutting head that can be moved along the support device vertically up and down and a breaking device in the area of the cutting device. The drawback of the device known from U.S. Pat. No. 4 871 104 is that it is suited exclusively for dividing glass panels into strips along cutting lines that are parallel to one another.

SUMMARY OF THE INVENTION

The object of the invention is to propose a process for dividing glass panels and a device suitable especially for performing it with which space is saved and expensive handling of the glass panels and blanks is avoided.

According to the invention, this object is achieved with the process of claim 1.

The device according to the invention, also suited for performing the process according to the invention, is characterized in that the stations for breaking the glass panels, relative to the conveying direction (arrow 26) of the glass panels through the device, are placed after the station for notching the glass panels and in that a device for pivoting parts of glass panels by 90° is provided between at least a first breaking station and the subsequent breaking stations.

Preferred and advantageous configurations of the process according to the invention and preferred and advantageous embodiments of the device according to the invention are the object of the subclaims.

With the process according to the invention and the device according to the invention, the glass panels are notched standing essentially vertically (in practice, slanted about 5° to 7° to the rear) while leaning on a support surface and then transported to the breaking stations. This results in a limited floorspace requirement for the device according to the invention and it is no longer necessary to lay the glass panels down into the horizontal position after they have been taken from a storage location and to upright the finally obtained blanks again into the essentially vertical position to take them, for example, to an insulating glass finishing line or to an intermediate storage location.

BRIEF DESCRIPTION OF THE DRAWINGS

Other details, features and advantages of the process according to the invention come out from the following description, which makes reference to the accompanying drawing. There are shown in.

DESCRIPTION OF THE PREFERRED EMBODIMENT

Since reference is made in the description below to various notched lines, parts and blanks of glass panels, they are explained first based on FIG. 1.

Figure 1:
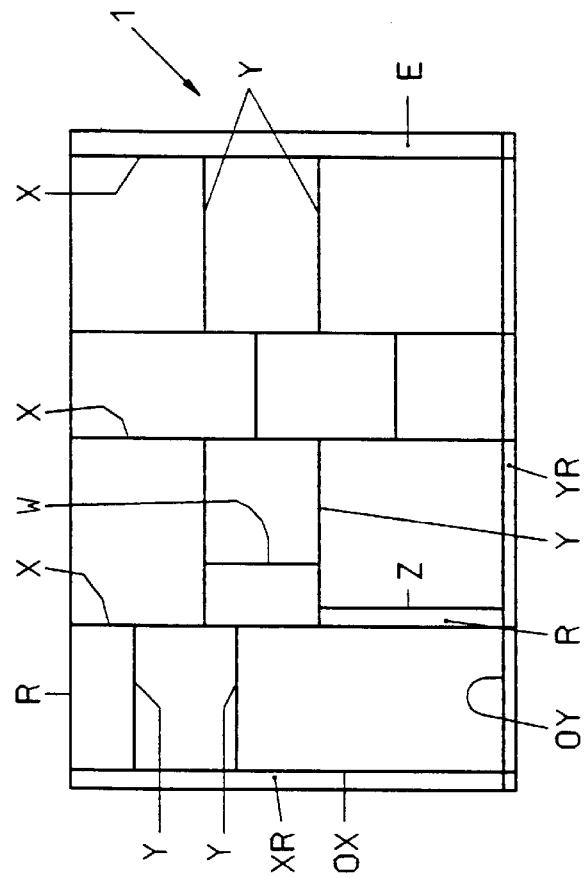
FIG. 1, a glass panel with notched lines.

A glass panel 1, as it is shown in FIG. 1, exhibits notched lines produced by a cutting tool (small cutting wheel). This involves X-cuts, which are notched lines parallel to the narrow edges of glass panel 1 and extending over its entire width, Y-cuts, which are notched lines running parallel to the lengthwise direction of glass panel 1 and run between X-cuts, further W-cuts, which run between two Y cuts and finally Z-cuts, which run parallel to the X-cuts between two Y-cuts.

A further two zero-cuts are provided, namely the OX-cut and the OY-cut, outside of which there are edge strips XR and YR. Finally, there are remnants that are not usable as blanks and are designated as residual pieces R or end pieces E.

It should still be pointed out that it is usual in the field of glazing to designate a cut that goes from edge to edge of a glass panel or a part of one as a "traverse," e.g., X-traverse.

In the following description, glass pieces that have been produced from glass panels 1 by breaking along the X-traverses are designated as "parts" of glass panel 1, and the first part also still exhibits an edge strip XR.

The device for dividing glass panels 1 encompasses an essentially vertical support wall 25, which can be made as a rolling wall or an air cushion wall and is slanted by 5° to 7°. On the lower edge of support wall 25 is provided a conveying device 13, designed in the embodiment as rotary actuated rollers, that supports glass panels 1, parts and blanks from below and moves in the direction of arrow 26 from station to station.

A cutting station 2 is provided in the device in the embodiment shown, a station in which a glass panel 1 is provided with notched lines, with the help of a cutting tool 15 and according to the preset pattern that is optimized, for example, by a computer program. Cutting tool 15 can be conveyed on a cutting beam 14 that is movable along support surface 25 in cutting station 2.

After cutting station 2 a first breaking station 3 and, after it, another breaking station 4 are provided. First breaking station 3 is used to open the X-cuts and second breaking station 4 is used to break off edge strip XR along the OX-cut.

A turning station 5 is provided after second breaking station 4 to pivot parts 27 of glass panels 1 around an axis oriented normal to support wall 25 into the position shown in the area of third breaking station 8. In this position, the Y-cuts run from top to bottom.

The Y-cuts are opened in third breaking station 8. If, in the then-present part of glass panel 1, there is still a cutting line (Z-cut or W-cut), this part is turned in second turning station 9 and the Z- or W-cut is opened in last breaking station 10.

A glass storing device 12, e.g., a partitioned vehicle, is provided at the output end of the device according to the invention. Partitioned vehicles that can be used are shown, e.g., in EP-A 477 163 and EP-A 603 151.

The embodiment of the breaking stations or the breaking devices and breaking tools provided in them is not primarily essential for the invention. The examples described below based on FIGS. 3 and 4 are thus only preferred embodiments.

Figure 3:
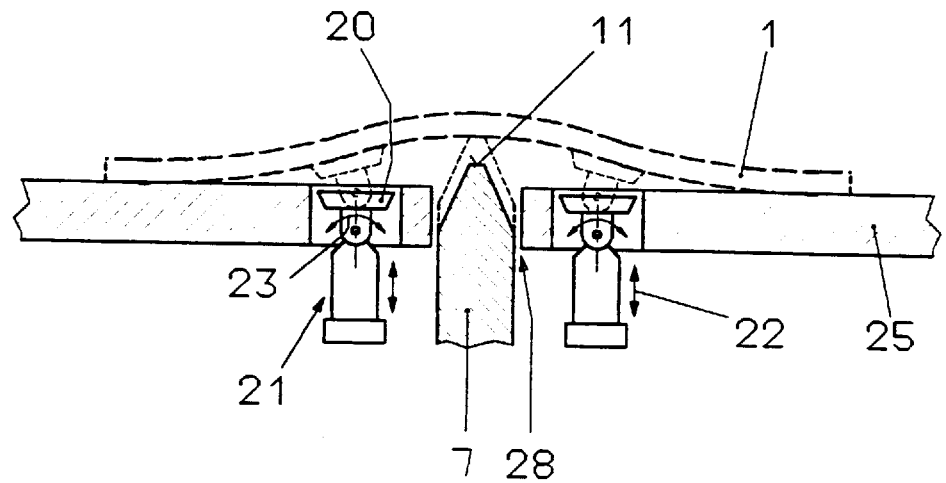
Figure 4:
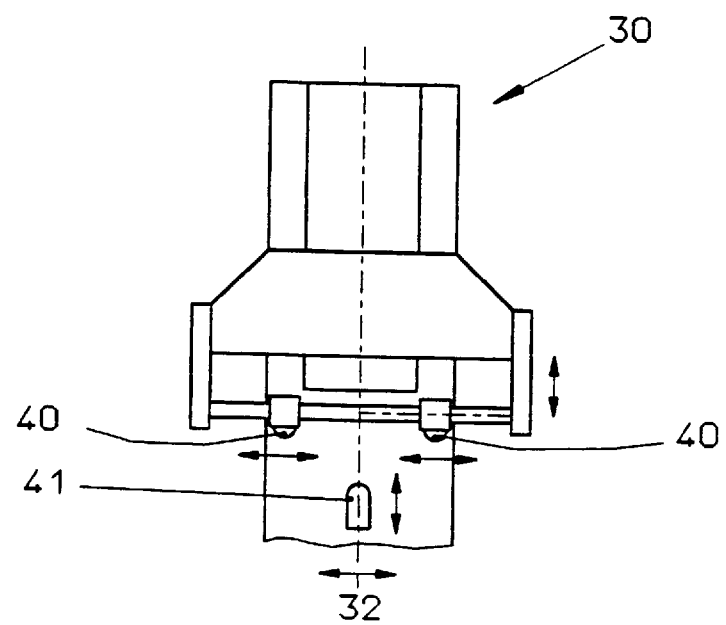

First breaking station 3 in which a glass panel 1 is divided into parts 27 by being broken along the X-cuts, has a breaking shoulder 7 and, in the embodiment, two suction devices 20 as hold-down devices, and the more detailed design is shown, for example, in FIG. 3. This embodiment can also be used in breaking stations 8 and 10.

Breaking shoulder 7 is provided to be adjustable in a gap 28 in support wall 25, perpendicular to it.

Glass panel 1 to be divided is conveyed forward so that an X-cut is produced before breaking shoulder 7 becomes upright. To perform the breaking procedure, breaking shoulder 7 is pushed forward into the position shown in dashed lines in FIG. 3 by hydraulic cylinders or the like.

To bend glass panel 1 during the breaking procedure, i.e., to stress it toward support wall 25, suction devices 20 that can be supplied with a partial vacuum are provided on both sides of gap 28 for breaking shoulder 7, and they are articulated by their actuation devices 21 so that they can be shifted not only in the direction of arrow 22 but also can be pivoted around axes oriented parallel to breaking shoulder 7 in the direction of double arrow 23. In this way, suction devices 20, as indicated in dashed or dotted lines in FIG. 3, can be positioned at a slant and hold so securely on the underside of glass panel 1, so that the latter is drawn, with suitable force, toward support wall 25.

Breaking shoulder 7 can also be moved so that its end lying in the area of suction devices 20 is first pushed forward so that the X-cut opens from bottom to top into a break.

First part 27, obtained by breaking glass panel 1 along its forwardmost X-traverse in the conveying direction (arrow 26), still has edge strip XR. It is broken off along the OX-cut in second breaking station 4. Second breaking station 4 can have, for example, a breaking tool 30 with an embodiment shown in FIG. 4. An edge strip E—if present—can be separated in breaking station 4 from a part 27 of glass panel 1 along the X-traverse that is last relative to the conveying direction.

Breaking station 8 is used to break parts 27 from glass panels 1 along the Y-traverses into blanks and to separate edge strips YR (they lie outside the OY-cut (Y-zero cut)) from the respective last blanks.

The example shown in FIG. 4 for a breaking tool 30 that can be used in breaking stations 3, 4, 8 and 10 has two hold-down devices 40 that can be raised and lowered and be laid from one side against glass panel 1 to be divided or a part 27 of it, and a block 41 that can be laid against it from the other side, e.g., from the side of support wall 25 in the area of the OX-cut or another cut., e.g., a Y-cut. Hold-down devices 40 and block 41 are designed, e.g., as (reference) cylinder-shaped plastic shoulders that lie, with a generatrix, on that of part 27 or of glass panel 1.

The distance between hold-down devices 40 can be changed so that the forces acting on part 27 or on glass panel 1 can be changed. In doing so, the distance between hold-down devices 40 is selected to be greater with thicker glass than with thinner glass.

During the breaking of parts 27 or of glass panels 1 with the help of breaking tool 30, block 41 can be pushed in front of the front side of support wall 25, thus to achieve an assured course of the break, for example, along the OX-cut. The extent to which block 41 is pushed forward in front of the front side of support wall 25 is selected depending on the glass thickness. It is pushed forward less with thicker glass than with thinner glass.

Turning stations 5 and 9 each have a turning gripper 16 that can be pivoted around an axis that lies in the area of conveying device 13, in particular its top edge (made of several rotary actuated conveying rollers), in the direction of the drawn arrow, to pivot a part 27 out of the position it assumes in breaking stations 4 and 5 and into the "lying" position shown in breaking station 8. Turning gripper 16 can be equipped with a gripping tool designed in any way. Preferred are suction devices that are placed on the arms of turning grippers 16 and that engage on the surfaces of parts or blanks facing away from support wall 25, to turn the former by 90°.

Additional turning station 9 provided following breaking station 8 is used to turn the blanks obtained so that their lengthwise dimension lies in the conveying direction (arrow 26) before they are inserted into storing device 12.

Figure 2:
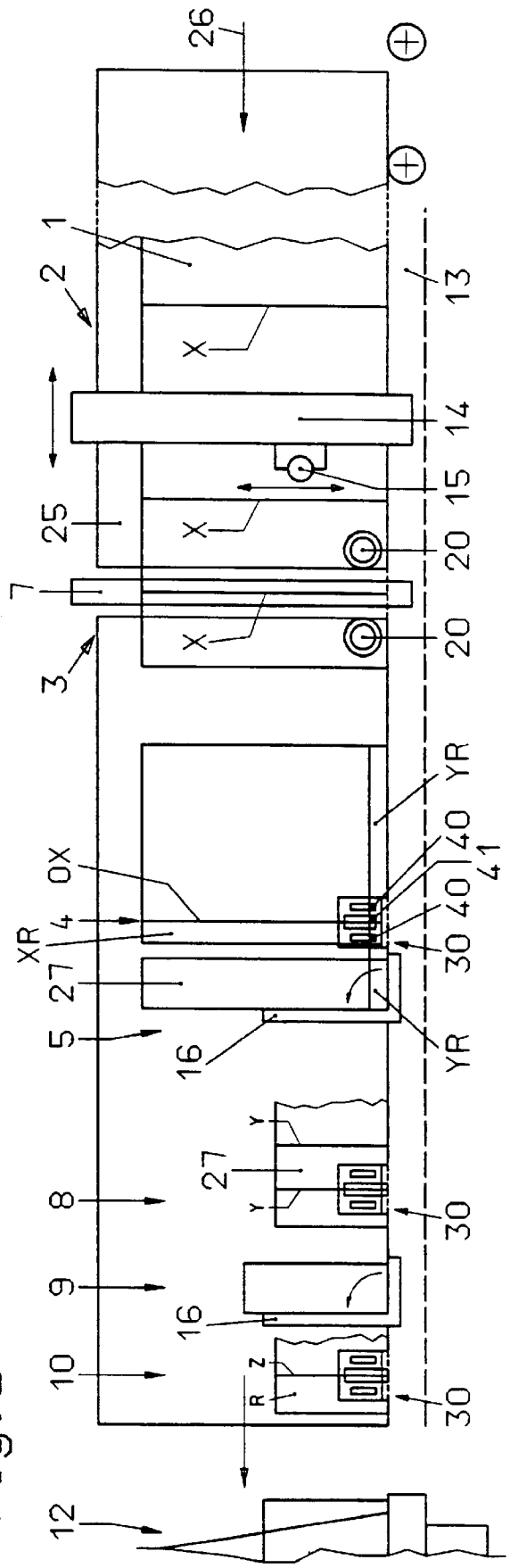
FIG. 2, diagrammatically and in view [sic], a device for dividing glass panels into blanks, FIG. 3, a breaking device (known from EP-A-457 751) that can be used in the device, FIG. 4, an embodiment of a breaking tool (known from EP-A-564 758).

If, in the parts of glass panels obtained after breaking station 8, Z- or W-cuts still exist, as is shown in FIG. 2 along one piece, the latter are opened in breaking station 10 with the help of breaking tool 30, i.e., e.g., a remnant R is separated from the blank.

In summary the invention can be represented, for example, as follows:

Glass panels are notched according to the blanks to be produced and then broken into blanks while they are oriented standing essentially vertically.

A device suited for this is exhibited by a station 2 for notching glass panels 1 with a support surface 25 oriented essentially vertically and a conveyor 13 on the lower edge of the support surface. Following station 2 there are a first breaking station 3 and a second breaking station 4 in which, successively, the X-traverses are opened and front edge sections XR are separated. Parts 27 of glass panels 1 obtained this way are turned in a turning station 5 by 90° around an axis perpendicular to support surface 25. The Y-traverses are broken in another breaking station 8. After edge strips (XR) and remnants R have been separated if need be, the blanks obtained this way can be inserted directly into a device 12 for intermediate storage of blanks or fed to an insulating glass line.

I claim:

1. A method of dividing a glass panel, having narrow edges defining a panel width and long edges defining a panel length, into blanks, comprising the steps of:

producing notched cutting X-lines parallel to said narrow edges of said glass panel and traversing said panel width with said glass panel being essentially vertically oriented;

producing notched cutting Y-lines parallel to said long edges between said notched cutting X-lines with said glass panel being essentially vertically oriented;

subsequent to producing said notched cutting X-lines and said notched cutting Y-lines, placing said glass panel in intermediate storage;

moving said glass panel from said intermediate storage to a breaking station wherein said glass panel is essentially vertically oriented and wherein said notched cutting X-lines are essentially vertically oriented;

breaking said glass panel into glass panel parts along said notched cutting X-lines;

pivoting said glass panel parts about an axis perpendicular to a plane of said glass panel parts so that said notched cutting Y-lines are essentially vertical; and dividing said glass panel parts into blanks along said notched cutting Y-lines.

2. A device for dividing glass panels into blanks, comprising:

a notching station for notching said glass panels with horizontal and vertical notched lines comprising a support surface that is oriented essentially vertically, a conveyor mounted on a lower edge of said notching station, and a cutting head that is adjustable along said support surface;

a first breaking station with first braking means for breaking glass along a notched line, placed in proximity to said notching station for accepting said glass panel from said notching station and for breaking said glass panel into glass panel parts by breaking said glass panel along said vertical notched lines;

a pivoting station placed in proximity to said first breaking station for accepting said glass panel parts and for pivoting said glass panel parts by 90° about an axis perpendicular to a plane of said glass panel parts so that said horizontal notched lines are vertically oriented; and a second breaking station with second breaking means for breaking said glass panel parts into blanks, placed in proximity to said pivoting station for accepting said glass panel parts and for dividing said glass panel parts into blanks by breaking said glass panel parts along said horizontal notched lines that are vertically oriented.

3. The device of claim 2, wherein, said first breaking station further comprises
a first breaking station support surface aligned with said support surface of said notching station, and
a first breaking station conveyor mounted on a lower edge of said first breaking station support surface; and said second breaking station further comprises
a second breaking station support surface aligned with said support surface of said notching station, and
a second breaking station conveyor mounted on a lower edge of said second breaking station support surface.

4. The device of claim 3, wherein said first breaking means comprises a breaking shoulder, said breaking shoulder being adjustable in a direction perpendicular to said first breaking station support surface and comprising hold-down devices located on each side of said breaking shoulder.

5. The device of claim 4, wherein said hold-down devices are suction devices.

6. The device of claim 3, wherein said second breaking means comprises a breaking tool having a block for laying against a first surface of said glass panel parts opposite said horizontal notched lines, and two back stops for laying against a second surface of said glass panel parts, wherein a distance between said block and said two back stops is made smaller during glass breaking.

7. The device of claim 6, wherein said hold-down devices and said breaking tool are located proximate to said first breaking station conveyor and said second breaking station conveyor respectively.

8. The device of claim 2, wherein said pivoting station further comprises
a pivoting station support surface aligned with said support surface of said notching station, and
a gripper, pivotable about an axis perpendicular to a plane of said pivoting station support surface, that can grip said glass panel parts.

9. The device of claim 8, wherein said pivoting station further comprises
a pivoting station conveyor mounted on a lower edge of said pivoting station support surface, said pivoting station conveyor having a top edge,
and wherein said gripper is pivotable about an axis perpendicularly aligned with said top edge.

10. A method of dividing a glass panel, having narrow edges defining a panel width and long edges defining a panel length, into blanks, comprising the steps of:

producing notched cutting X-lines parallel to said narrow edges of said glass panel and traversing said panel width with said glass panel being essentially vertically oriented;

producing notched cutting Y-lines parallel to said long edges between said notched cutting X-lines with said glass panel being essentially vertically oriented;

subsequent to producing said notched cutting X-lines and said notched cutting Y-lines, moving said glass panel to a breaking station wherein said glass panel is essentially vertically oriented and wherein said notched cutting X-lines are essentially vertically oriented;

breaking said glass panel into glass panel parts along said notched cutting X-lines;

pivoting said glass panel parts about an axis perpendicular to a plane of said glass panel parts so that said notched cutting Y-lines are essentially vertically oriented; and dividing said glass panel parts into blanks along said notched cutting Y-lines.

11. The method of claim 10, further comprising the steps of:

producing a notched cutting edge-line parallel to said narrow edges of said glass panel and traversing said panel width; and breaking from one of said glass panel parts an edge strip by breaking said one glass panel part along said notched cutting edge-line.

12. The method of claim 10, further comprising the step of placing said blanks into a storage location.

13. An apparatus for dividing a glass panel into blanks, comprising:

a first station for accepting said glass panel, for retaining said glass panel in an essentially vertical position, and for breaking said glass panel into glass panel parts by breaking said glass panel along vertical notching lines while maintaining said glass panel in an essentially vertical position;

a second station placed proximate to said first station for accepting said glass panel parts from said first station, for retaining said glass panel parts in an essentially vertical position, and for pivoting said glass panel parts by 90° about an axis perpendicular to a plane of said glass panel parts; and a third station placed proximate to said second station for accepting said glass panel parts from said second station, for retaining said glass panel parts in an essentially vertical position, and for breaking said glass panels into blanks by breaking said glass panels parts along notching lines vertically oriented while maintaining said glass panel parts in an essentially vertical position.

* * * * *